(12) United States Patent
Baldus et al.

(10) Patent No.: US 8,678,695 B2
(45) Date of Patent: Mar. 25, 2014

(54) DEVICE FOR FASTENING A ROLLBAR OR SIMILAR ATTACHMENT PART ON A VEHICLE

(75) Inventors: Matthias Baldus, Marienhausen (DE); Matthias Bender, Rheinboellen (DE); Thomas Darscheid, Boppard (DE); Diana Duenchel, Andernach (DE); Helmut Roetsch, Beltheim (DE)

(73) Assignee: BOMAG GmbH, Boppard (DE)

( * ) Notice: Subject to any disclaimer, the term of this patent is extended or adjusted under 35 U.S.C. 154(b) by 195 days.

(21) Appl. No.: 13/085,826

(22) Filed: Apr. 13, 2011

(65) Prior Publication Data

US 2011/0299916 A1 Dec. 8, 2011

(30) Foreign Application Priority Data

Apr. 14, 2010 (DE) ............... 20 2010 004 971 U (51) Int. Cl.
*F16F 1/38* (2006.01)

(52) U.S. Cl.
USPC ......... 403/223; 403/225; 267/141.3; 280/756

(58) Field of Classification Search
USPC ............. 403/203, 221, 223, 225, 228, 408.1; 267/141.2, 141.3, 141.4, 141.5; 280/756; 411/166, 432
See application file for complete search history.

(56) References Cited

U.S. PATENT DOCUMENTS

| | | | |
|---|---|---|---|
| 1,491,948 A | 4/1924 | Dietz | |
| 2,538,658 A * | 1/1951 | Saurer | 267/141.5 |
| 2,725,692 A * | 12/1955 | Andreae | 403/225 |
| 3,036,858 A * | 5/1962 | Fingerut | 280/756 |
| 3,450,430 A | 6/1969 | Wendt et al. | |
| 3,872,950 A | 3/1975 | Ashfield et al. | |
| 3,933,371 A * | 1/1976 | Graham | 280/756 |
| 3,990,738 A | 11/1976 | Kolinger et al. | |
| 4,077,655 A | 3/1978 | Skahill | |
| 4,196,775 A * | 4/1980 | Groh | 165/68 |
| 4,210,362 A * | 7/1980 | Boersma | 296/190.07 |
| 4,720,075 A * | 1/1988 | Peterson et al. | 267/292 |

(Continued)

FOREIGN PATENT DOCUMENTS

| | | |
|---|---|---|
| FR | 2332900 A1 | 6/1977 |
| GB | 1557284 A | 12/1979 |

OTHER PUBLICATIONS

European Patent Office, European Search Report, Application No. 11002176.3, dated Aug. 9, 2011 (6 pages).

*Primary Examiner* — Michael P Ferguson
(74) *Attorney, Agent, or Firm* — Wood, Herron & Evans, LLP (57) ABSTRACT

A device for fastening a rollbar or similar attachment part on a vehicle, in particular a vibration roller, includes an inner installation sleeve, which is or can be operationally linked to a bar receptacle on the vehicle, an outer installation sleeve, which at least partially encloses the inner installation sleeve and is or can be operationally linked to the rollbar, and at least one elastomeric element, which positions the inner installation sleeve relative to the outer installation sleeve in such a way that the two sleeves are spaced apart from one another while partially forming a vibration clearance. In addition, the present invention relates to a rollbar or similar attachment parts for attachment on a vehicle, in particular on a vibration roller, having at least one device according to the above-mentioned type, which is implemented, in particular integrated on the rollbar.

11 Claims, 6 Drawing Sheets

(56) References Cited

U.S. PATENT DOCUMENTS

| | | | |
|---|---|---|---|
| 5,876,023 A * | 3/1999 | Hain et al. | 267/141.4 |
| 6,450,473 B1 | 9/2002 | Kondo et al. | |
| 7,163,200 B2 * | 1/2007 | Dickson et al. | 267/141.4 |

* cited by examiner

DEVICE FOR FASTENING A ROLLBAR OR SIMILAR ATTACHMENT PART ON A VEHICLE

The present application claims priority under 35 U.S.C. § 119 of German Patent Application No. 20 2010 004 971.7 filed Apr. 14, 2010, the disclosure of which is hereby incorporated herein by reference in its entirety.

FIELD OF THE INVENTION

The present invention relates to a device for fastening a rollbar or similar attachment part on a vehicle and, in particular, on a vibration roller. In addition, the present invention relates to a rollbar or similar attachment parts for attachment on such a vehicle.

BACKGROUND OF THE INVENTION

Rollbars or similar attachment parts are known from the prior art. Especially in vehicles from the field of construction, and in particular in the case of vibration rollers, it is necessary to install rollbars or similar attachment parts, for example, protection bars, but also mounting brackets for control consoles, etc., on the vehicle in such a way that the vehicle vibrations are not transmitted to the bar or vice versa.

Various solutions are known for this purpose. The fundamental idea is to decouple the bar in a vibration-damping manner from the vehicle in such a way that structure-borne noise transmission of the vibrations does not occur. For this purpose, for example, U.S. Pat. No. 4,077,655 A describes a rollbar for a vehicle (also referred to as ROPS hereafter), a post element of the ROPS being installed at its end on a unit which is provided with elastomeric inserts and is fixedly connected to the frame of the vehicle. A through screw having a nut is used for the fastening.

Another solution is described in U.S. Pat. No. 3,450,430 A. It describes a cab and a rollbar for a vehicle, the spars of the rollbar running without contact through a channel in the cab wall, so that the driver in the cab, which rests on an elastic material, is protected from the vibrations of the rollbar. In contrast, the rollbar itself is fastened rigidly on the frame.

In contrast, U.S. Pat. No. 6,450,473 B1 relates to a dynamic vibration absorber of a vehicle. The core idea comprises reducing the vibrations occurring on the vehicle in specific frequency ranges with the aid of a vibrating absorber system. The vibration absorber can be installed on a mount which is additionally damped by rubber cushions.

A similar device is disclosed in U.S. Pat. No. 3,872,950 A, in which a vibration damper for a rollbar of a vehicle is also used. A hollow rollbar is installed on an installation projection here, the rollbar being separated from the installation projection by rubber dampers. The mass of the installation projection is selected in such a way that the mutual cancellation of the vibrations is made possible.

The above-described structures allow the vibration-free installation of a rollbar or similar component on a vehicle only with high outlay and accompanied by technically complex systems. In particular the free positioning of a rollbar on the vehicle is typically not allowed at all here.

Accordingly, the present invention is based on the object of providing a device for fastening a rollbar or similar attachment part on a vehicle which allows for simpler installation and improved vibration damping of the rollbar or similar attachment part on the vehicle and, in particular, a vibration roller.

SUMMARY OF THE INVENTION

According to one embodiment of the present invention, a device for fastening a rollbar or similar attachment part on a vehicle, in particular a vibration roller, having an inner installation sleeve, which is or can be operationally linked to a bar receptacle on the vehicle, an outer installation sleeve, which at least partially encloses the inner installation sleeve and which is or can be operationally linked to the rollbar, and at least one elastomeric element, which positions the inner installation sleeve relative to the outer installation sleeve in such a way that the two sleeves are spaced apart from one another while forming a vibration clearance.

According to one aspect of the device according to the present invention, or the rollbar equipped therewith, is the use of two installation sleeves, which are implemented in such a way that an outer installation sleeve, which is situated on the rollbar and in particular integrated therein, at least partially encloses an inner installation sleeve, this inner installation sleeve being used for the fastening on the vehicle. An elastomeric element is situated between the outer installation sleeve and the inner installation sleeve in such a way that the two installation sleeves are operationally linked to one another, but are contact-free except for the area in which they are connected to one another via the elastomeric element. Therefore, they form a vibration clearance therein. The elastomeric element is used, inter alia, for load transmission from the bar into the vehicle and vice versa. Through the above "coupling element", comprising the inner installation sleeve, the outer installation sleeve, and the interposed elastomeric element, a very compact and simple device may be provided, to install a rollbar or a similar attachment part in a vibration-damping way on a vehicle.

Installation sleeves are understood in the scope of the present invention as all hollow body components in which the requirement of enclosure can be fulfilled, i.e., the outer installation sleeve at least partially encompasses or encloses the inner installation sleeve. The term outer installation sleeve is understood in the scope of the present invention as any component which is at least partially implemented to receive the inner installation sleeve. Therefore, the term outer installation sleeve thus also comprises a hollow cylinder or similar component which is continuously open in its longitudinal axis. However, this term also comprises components which are closed on one side, for example, i.e., are implemented as pot-shaped, etc. An inner installation sleeve is understood in the scope of the invention as any component which can be inserted into the outer installation sleeve to form the vibration clearance in such a way that it is at least partially enclosed thereby. Components that are implemented both as hollow bodies and also as solid components are thus understood here.

The inner installation sleeve and/or the outer installation sleeve are preferably implemented as rotationally-symmetric and/or coaxial to their respective longitudinal axis. The implementation of a rotational symmetry allows the implementation of a damping fastening device, which has similar properties in nearly any direction orthogonal to the longitudinal axis of the sleeves. This is similarly true for the coaxial implementation of the two installation sleeves.

The inner installation sleeve is preferably implemented in such a way that it can be brought into direct press contact with the vehicle while simultaneously decoupling the other components of the device or the associated installation bar. This decoupling is achieved in that the inner installation sleeve is implemented in such a way that at least one vibration clearance as described above is implemented to all associated components of the device and the installation bar.

The elastomeric element preferably has an elastomeric sleeve, which is situated between the inner installation sleeve and the outer installation sleeve. For example, this elastomeric sleeve completely encloses the outer wall of the inner installation sleeve, the elastomeric element being fixed on the outer wall of the inner installation sleeve. However, this installation sleeve simultaneously also presses against the inner wall of the outer installation sleeve in such a way that a friction lock results between the inner and the outer installation sleeves. This friction lock is used for the purpose of transmitting bearing forces from the rollbar via the outer installation sleeve into the inner installation sleeve and from there into the vehicle or vice versa.

Of course, instead of the implementation of a radially peripheral elastomeric sleeve, it is also possible to situate the elastomeric sleeve or the elastomeric element only in spots on the inner installation sleeve or in the outer installation sleeve. Thus, for example, it is possible to implement an elastomeric element which runs completely radially around the outer wall of the inner installation sleeve, but only presses against the inner wall of the outer installation sleeve using corresponding elastomeric webs. It is also possible to provide the elastomeric element or an elastomeric sleeve with corresponding reinforcement elements, in particular to improve the force introduction and force dissipation. Such elements can be steel inlays or corresponding load-distributing inlays, for example.

The elastomeric element is preferably only situated along a subsection of the longitudinal axis in relation to the longitudinal axis of the inner installation sleeve and/or the outer installation sleeve. Therefore, this means that, for example, the elastomeric element is only implemented over 50% of the total longitudinal axis length of the respective installation sleeve on the inner installation sleeve or in the outer installation sleeve. The remaining 50% can then, as described in greater detail hereafter, be used for an intersection area to guide the two installation sleeves relative to one another, for example, and in particular in the direction of the longitudinal axis. Of course, it is also possible to situate multiple elastomeric elements or elastomeric sleeves in particular along the longitudinal axis, if this is necessary.

The subsection is preferably formed by a particularly radially peripheral recess on the outer wall of the inner installation sleeve and/or on the inner wall of the outer installation sleeve or an elastomeric seat which is implemented as at least partially complementary to the elastomeric element. Such a recess or such a seat can be a groove, for example, into which a corresponding elastomeric sleeve or a corresponding elastomeric element, which has a complementary shape, can be inserted. In this way, the friction-locked positioning of the installation element on or in the respective installation sleeve is possible. The recess can be implemented in both axes of symmetry of the installation sleeve. Thus, the recess can therefore have a radially running setback or projection in the inner wall or outer wall of the respective sleeves, but it is also possible to provide a recess or undercut in the longitudinal axis direction, so that, for example, the elastomeric element can be fastened on the respective installation sleeve in a type of tongue-and-groove system. All methods known from the prior art for the clamp fixing of an elastomeric element in or on an object in particular are applicable here.

The inner installation sleeve and the outer installation sleeve preferably have a mutual intersection area, which is implemented in such a way that it prevents a movement of the outer installation sleeve relative to the inner installation sleeve, in particular in the opposite direction to the bar receptacle on the vehicle, beyond the vibration clearance formed by the two sleeves. This means that the intersection area is implemented in such a way that the two sleeves can move relative to one another, in particular separated from one another by the vibration clearance, but they cannot touch one another. The two sleeves only abut one another in the intersection area when the relative movement to one another is greater than the vibration clearance formed by the two sleeves. The intersection area is thus used to secure the two sleeves relative to one another if the friction lock of the elastomeric element fails. Therefore, if the elastomeric element is no longer capable of damping the relative movement of the two sleeves to one another, transferring loads accordingly, and in particular positioning the two sleeves relative to one another while forming the vibration clearance, the intersection area prevents the two sleeves from striking against one another and in particular the inner installation sleeve from sliding out of the outer installation sleeve. Even in the event of loads of the bar which exceed the maximum loads transmittable by the elastomeric elements, the elements of the intersection area come into contact with one another in such a way that a nondestructive and safe load dissipation is ensured.

To form the intersection area, the inner installation sleeve preferably has at least one locking extension, which particularly protrudes radially out of its outer sleeve wall, and the outer installation sleeve has at least one extension receptacle, which is radially set back in its inner sleeve wall, into which the locking extension protrudes while at least maintaining the vibration clearance, or vice versa. Such a "pin system" guarantees the location securing of the two installation sleeves relative to one another to a particular degree, if the friction lock by the elastomeric element fails. Even upon the occurrence of very large relative movements to one another, the above-described intersection areas can prevent the destruction of the elastomeric element, in that the relative movement is stopped by the mutual striking of the sleeves on one another in the intersection area. This striking on one another does transmit vibrations from the vehicle to the rollbar and vice versa, but effectively presents overstretching of the elastomeric element in particular and the destruction thereof or the detachment thereof from the sleeve walls.

The locking extension and/or the extension receptacle are preferably implemented as radially peripheral, in order to ensure the largest possible stop surface and thus the most effective possible force introduction and avoidance of any destruction of the respective components.

The intersection area is preferably formed by a folded stop structure, one or more folds being implemented on the inner installation sleeve and/or on the outer installation sleeve, which, while maintaining the respective vibration clearance, are opposed by suitable stop surfaces, which are implemented on the respective other installation sleeve. The folds only come into contact with the stop surfaces after a relative movement of the two sleeves which exceeds the vibration clearance, so that the relative movement is stopped.

The intersection area and the subsection are preferably situated one behind the other relation to the longitudinal axis of the inner installation sleeve and/or the outer installation sleeve. In this way, it is thus possible to form a very compact device, in which the connection in series of subsection, i.e., mounting of the elastomeric element over a specific area of the longitudinal axis, and intersection area, i.e., the securing in location of the two installation sleeves relative to one another in the event of a failure of the elastomeric element, results in a very small and compact component.

The inner installation sleeve preferably has a fastener receptacle in its sleeve inner chamber, which can be operationally linked to a fastener on the bar receptacle, or vice versa. Such a fastener receptacle can be an internal thread into which a threaded bolt, which is fastened on the vehicle or can be guided through a corresponding bolt receptacle on the vehicle, can be screwed, whereby the device is fastenable together with the associated rollbar on the vehicle. Of course, this structure can also be executed in the other direction, i.e., in that a threaded bolt is fastened on the inner installation sleeve, which can be guided through a corresponding threaded bolt receptacle on the vehicle and locked using a nut. All fastening systems known from the prior art are also applicable here.

Fundamentally, of course, it is possible to provide multiple devices on the rollbar or similar attachment part and in particular integrate them therein. Of course, it is also possible to use different devices, which are similar in their function, however, in parallel on a bar. Thus, for example, devices having threaded or bearing bolts situated on the inner installation sleeve can be provided together with devices into which suitable locking bolts can be screwed. All devices known from the prior art are also applicable here.

The device according to the present invention can both be integrated on the rollbar, i.e., implemented integrally therewith, but it can also be fastened via corresponding fasteners and in particular removably on the respective rollbar or on the vehicle. It is also possible to provide corresponding plug or catch devices, using which the device is fastenable on the respective rollbar or attachment part.

The intersection area is preferably implemented in such a way that the inner installation sleeve can be inserted at least from one installation side into the outer installation sleeve. This makes the assembly of the device significantly easier.

BRIEF DESCRIPTION OF THE DRAWINGS

The invention is described hereafter on the basis of two exemplary embodiments, which are explained in greater detail by the appended drawings. In the figures.

The same reference numerals are used hereafter for identical and identically acting components, apostrophes being used for differentiation.

DETAILED DESCRIPTION OF THE INVENTION

Figure 1:
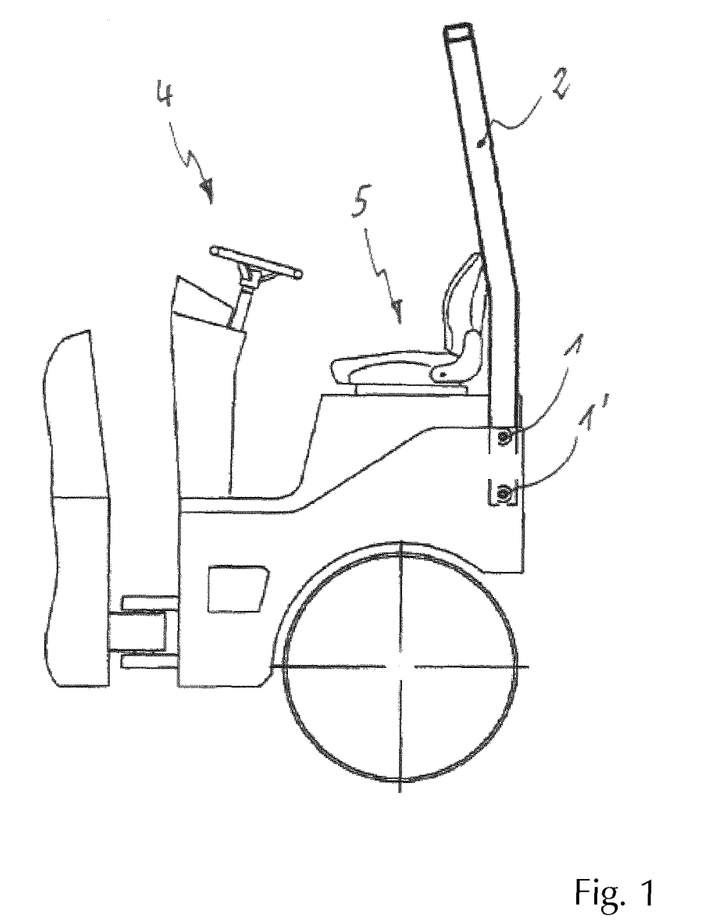
FIG. 1 shows a schematic side view of a driver stand of a vibration roller.
Figure 2:
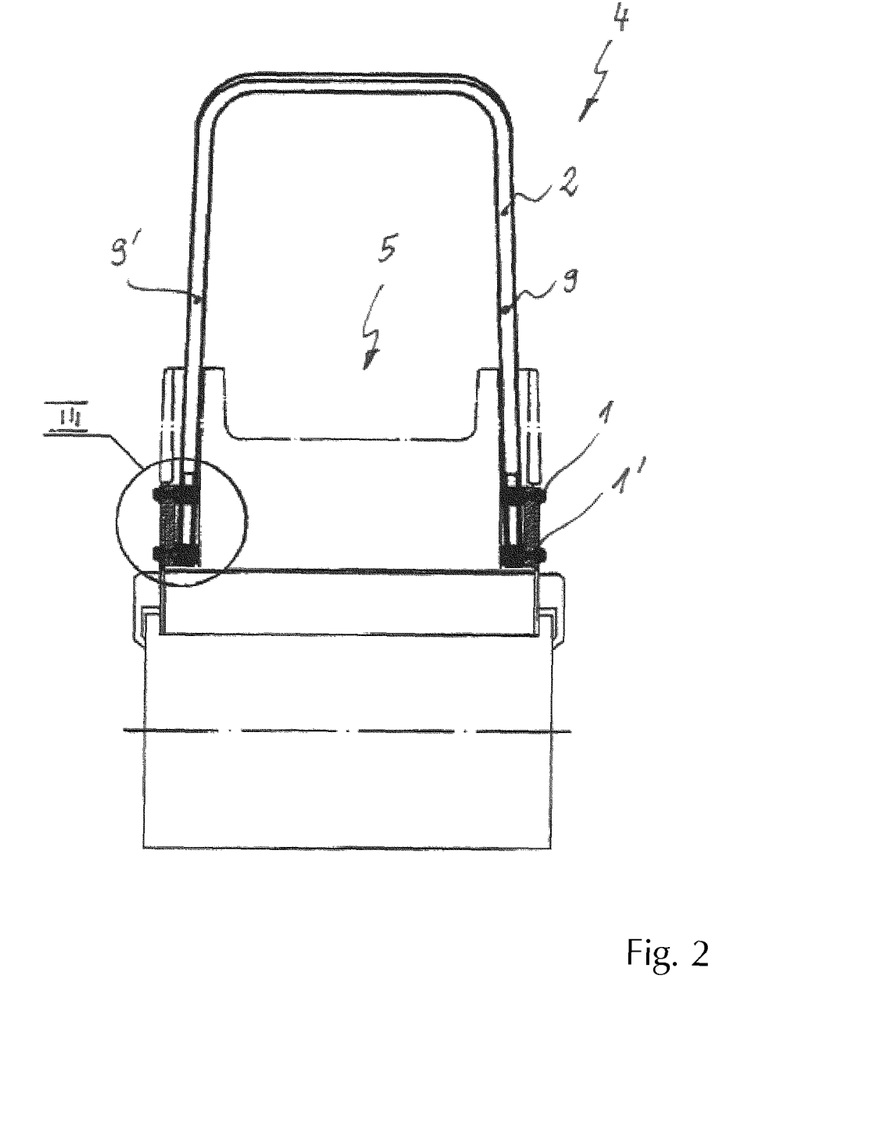
FIG. 2 shows a schematic rear view of the vibration roller from FIG. 1.

FIGS. 1 and 2 schematically show the driver stand 5 of a vibration roller 4 in a side view (FIG. 1) and a rear view (FIG. 2). The vibration roller or the vehicle 4 has a driver stand 5, on which the driver is located when driving the vehicle 4. In order to protect the driver from harm in particular if the vehicle turns over or also in the event of externally acting loads, a rollbar 2 is fastened on the vehicle 4. In order to prevent vibrations from being introduced from the vehicle 4 into the rollbar 2 during operation of the vehicle 4, it is equipped with a device 1 according to one embodiment of the present invention for fastening a rollbar on a vehicle. As shown in FIG. 2 in particular, in this embodiment, a total of four such devices 1 are provided, to fasten the rollbar 2 on the vehicle 4 via its two legs 9.

Figure 3:
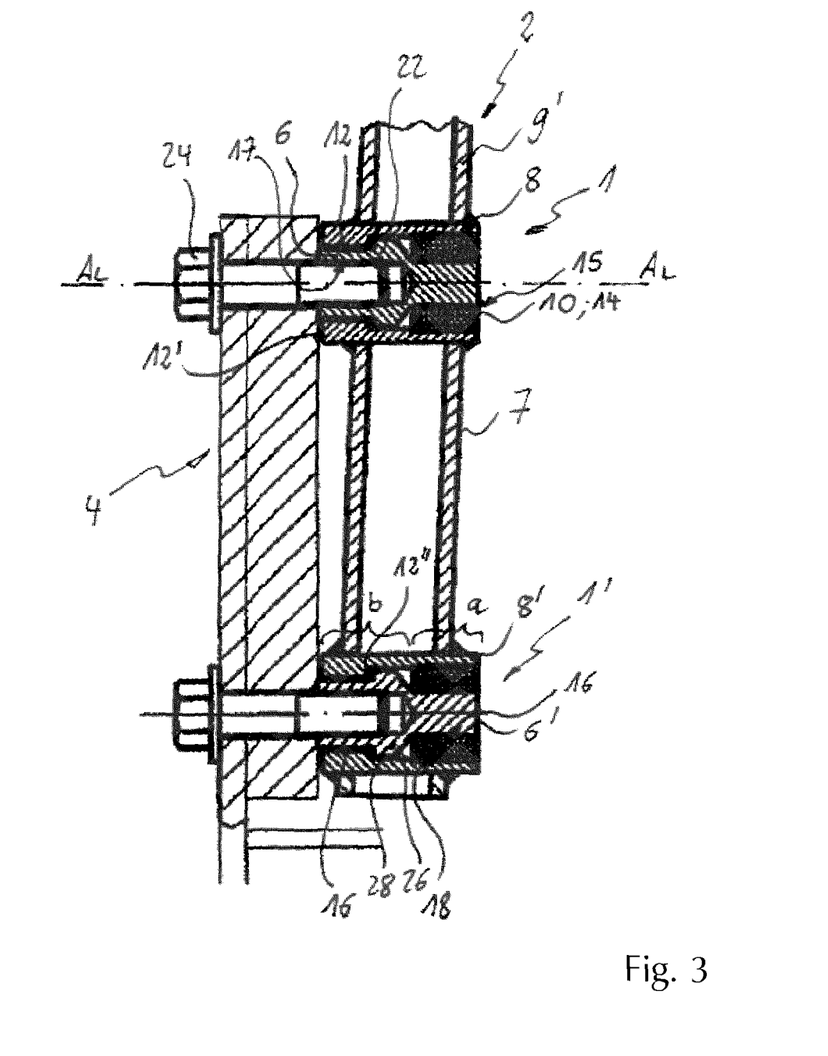
FIG. 3 shows a detail view of an embodiment of the device for fastening a rollbar on the vibration roller according to the section indicated in FIG. 2.

The devices 1 are shown in detail in FIG. 3 corresponding to the section indicated in FIG. 2.

The rollbar 2 comprises a hollow tube 7 in one embodiment as shown, into which two of the devices 1 according to the invention are incorporated per free leg 9. In this embodiment, the respective device 1 or at least a component of the device 1 is therefore implemented integrally with the respective leg 9 of the rollbar 2.

The device 1 according to one embodiment of the present invention comprises an outer installation sleeve 8, which is welded as shown to the hollow tube 7 of the rollbar 2. An inner installation sleeve 6, which can be screwed onto the vehicle 4 via a fastener 24, such as via a threaded bolt as shown, is situated in the interior of the outer installation sleeve 8. The inner installation sleeve 6 and the outer installation sleeve 8 are coupled to one another in a friction-locked way via an elastomeric element 10, which is implemented in one embodiment as shown as an elastomeric sleeve 14, with the inner installation sleeve 6 and the outer installation sleeve 8 being implemented and situated relative to one another in such a way that they are out of contact via a vibration clearance 12. Vibrations which are introduced via the vehicle 4 and the fastener 24 into the inner sleeve 6 are therefore, due to the implementation of the vibration clearance 12 and the acoustic decoupling using the elastomeric element 10, not introduced into the outer installation sleeve 8 and therefrom further into the rollbar 2. Loads which are introduced via the bar 2, for example, are safely dissipated into the vehicle 4 via the elastomeric element 10.

The fixing of the fastener 24 is performed in one embodiment via a fastener receptacle 22, implemented in one embodiment as shown in the form of an internal thread on the inner wall 17 of the inner installation sleeve 6.

The inner installation sleeve 6 is implemented in one embodiment as shown as an inner installation bolt, with a recess 15 implemented as shown in a subsection "a" allowing the receiving of the elastomeric element 10 or the elastomeric sleeve 14. In addition, securing in position between inner installation sleeve 6 and outer installation sleeve 8 is provided at an intersection area "b".

The subsection "a" is formed in this embodiment by a setback of the outer wall 16 of the inner installation sleeve 6 and a setback of the inner wall 18 of the outer installation sleeve 8. The elastomeric element 10 engages in a friction-locked way in this recess 15 formed by the two setbacks, so that the inner installation sleeve 6 is positioned in a defined way to the outer installation sleeve 8. In this embodiment, the vibration clearance 12 resulting through this positioning is implemented in such a way that "normal" vibrations to be expected do not result in striking of the two sleeves 6, 8 on one another.

In relation to the longitudinal axes $A_L$ as shown of the two coaxially situated installation sleeves 6, 8, in addition to the subsection "a", the intersection area "b" is implemented, which is used to secure the two sleeves in location relative to one another. For this purpose, in this embodiment a protruding locking extension 26 is implemented on the inner installation sleeve 6, which engages in a set-back extension receptacle 28 on the outer installation sleeve 8. The locking extension 26 and the extension receptacle 28 are implemented and situated in such a way that a vibration clearance 12 nonetheless results between them, so that the two components do not strike against one another in the case of normal vibrations. Striking only occurs in the case of a failure of the friction lock by the elastomeric element 10 or in the case of vibrations which exceed the normal oscillation curve, so that the relative movement of the two sleeves to one another is stopped. The elements of the intersection area "b" also come into contact one another in the event of loads of the bar 2 which exceed the maximum loads transmittable by the elastomeric element 10, so that nondestructive and safe load dissipation is ensured. In addition, in particular in the event of a failure of the friction lock on the elastomeric element 10, the inner installation sleeve 6 does not slide out of the outer installation sleeve 8, because then the intersection area "b" ensures the mounting of the two components 6, 8 relative to one another. Instead of the implementation of a single extension 26 or a single extension receptacle 28 as shown, of course, multiple such receptacles can also be implemented.

Figure 4:
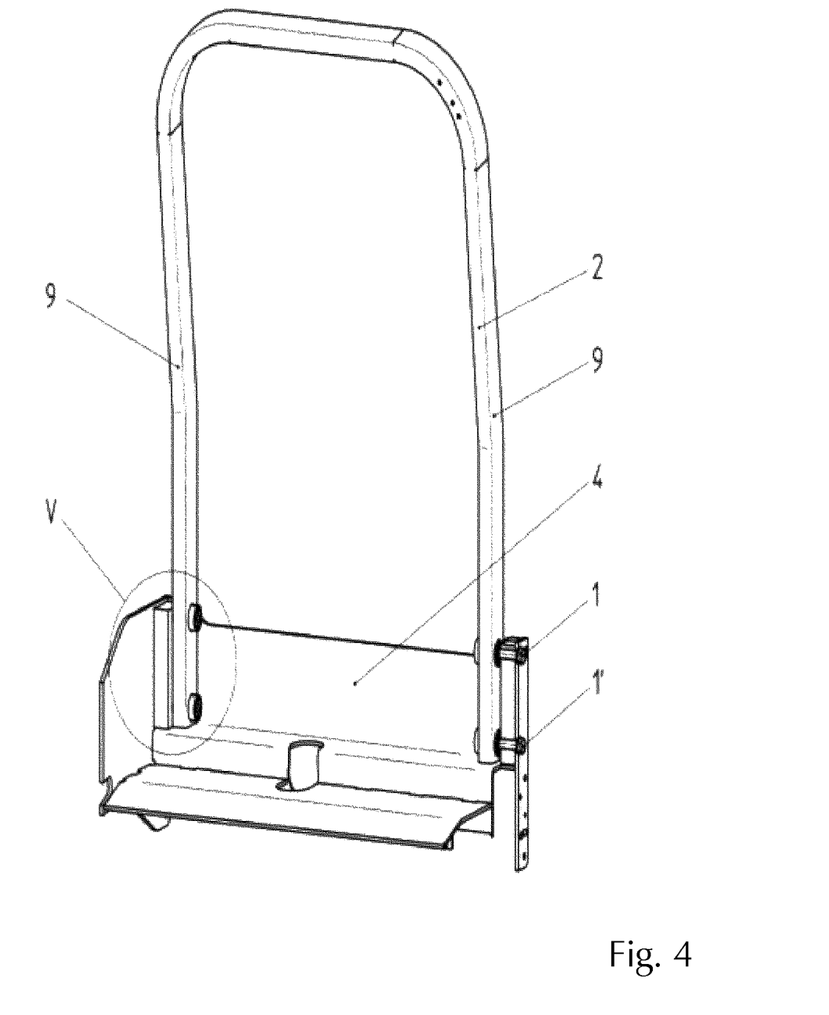
FIG. 4 shows an isometric view of a second embodiment of the device according to the present invention for fastening a rollbar on a vibration roller.

FIG. 4 shows a second embodiment of the installation device according to the present invention, a rollbar 2 also being fastened as shown using its two legs 9 via corresponding devices 1 on a vehicle 4 and, in particular, a vibration roller.

Figure 5:
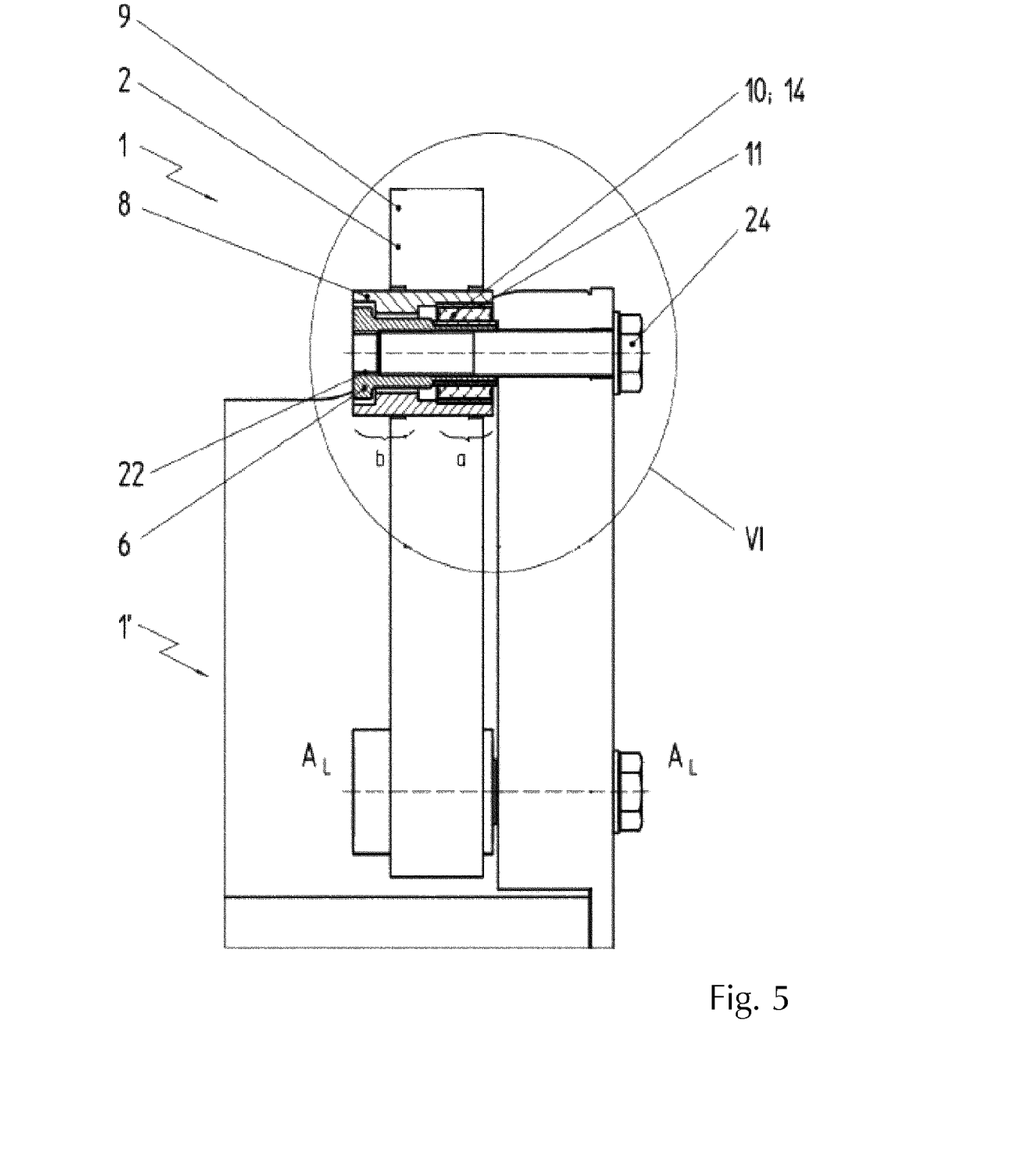
FIG. 5 shows a detail view of the device according to FIG. 4.
Figure 6:
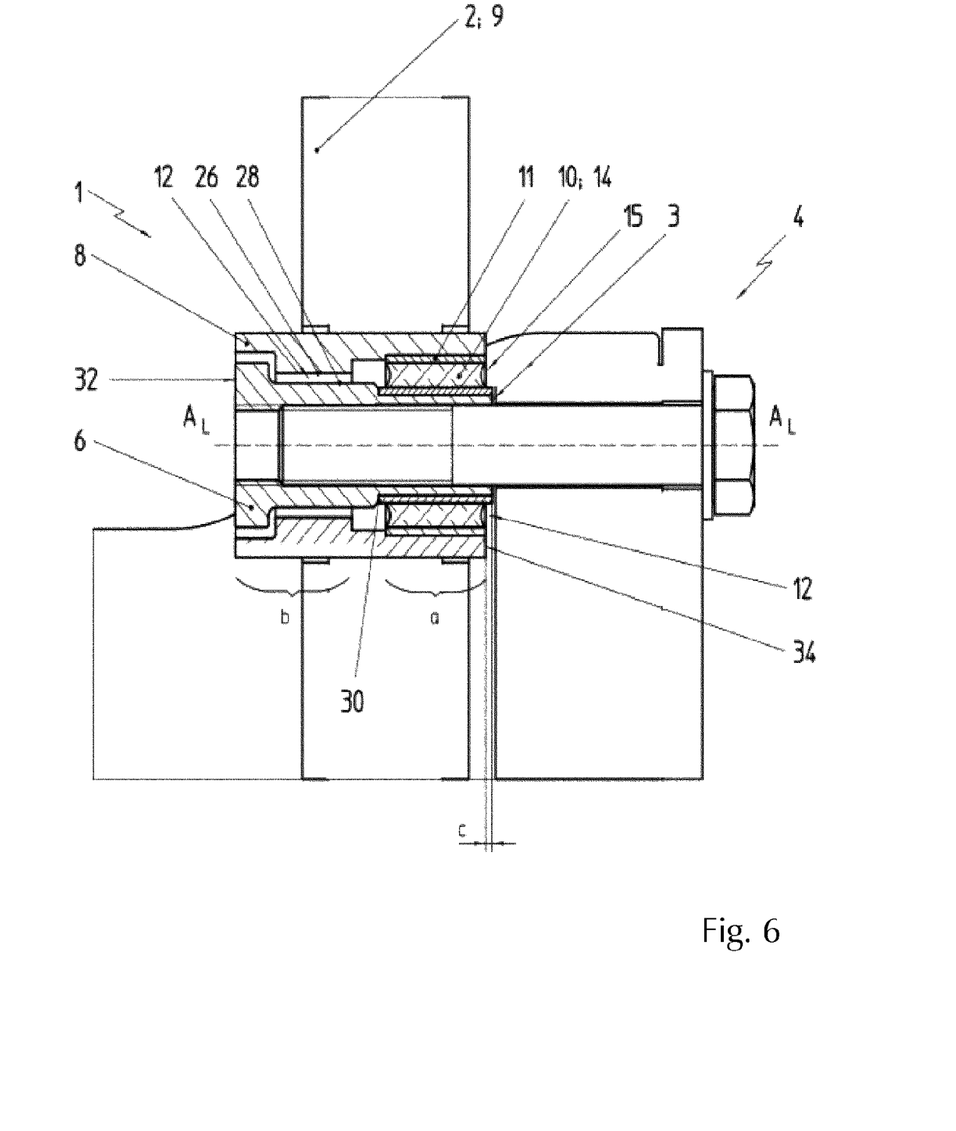
FIG. 6 shows a detail view of the device according to FIG. 5.

As shown in FIGS. 5 and 6, the device according to one embodiment of the present invention also again comprises an inner installation sleeve 6 as shown, which is partially enclosed by an outer installation sleeve 8, which is fixed and particularly welded on the leg 9 of the rollbar 2. In contrast to the preceding embodiment, the inner installation sleeve 6 is also implemented as a complete hollow body as shown. The fastening of the device 1 is again performed via a fastener 24 and in particular a threaded bolt, which can be screwed into an internal thread 22 on the inner installation sleeve 6.

As shown, the elastomeric element 10, which positions the inner installation sleeve 6 and the outer installation sleeve 8 to one another, comprises reinforcement inlays 11, which are used in particular for uniform force introduction.

An intersection area "b" is also again shown, which ensures securing in location of the two installation sleeves 6, 8, in particular in the direction of the longitudinal axis $A_L$, and in particular in the event of failure of the friction lock by the elastomeric element 10. The intersection area "b" comprises, as in the preceding embodiment, a locking extension 26 and an extension receptacle 28, in the form of stop flange and flange receptacle, which ensure the sleeves 6, 8 are secured in location, in particular in the longitudinal direction $A_L$. The elastomeric element 10 in the form of an elastomeric sleeve 14 is also again situated as shown in a subsection "a" in relation to the longitudinal axis $A_L$ of the two sleeves 6, 8.

As is recognizable in FIG. 6 in particular, the subsection "a" for receiving the elastomeric element 10 or the elastomeric sleeve 14 is implemented in such a way that it also has a stop surface 30 in the direction of the intersection area "b", against which the elastomeric element 10 strikes in the event of a movement of the two sleeves 6, 8 relative to one another in the direction of the longitudinal axis $A_L$. In this way, it is ensured that a vibration not only in the radial direction but rather also in the longitudinal direction effectively occurs without the adhesive friction lock between the elastomeric element 10 and the inner installation sleeve 6 in particular being detached.

The intersection area is preferably implemented in such a way that the inner installation sleeve 6 can be inserted at least from one installation side into the outer installation sleeve 8. This makes it much easier to assemble the device 1.

The inner installation sleeve 6 and the outer installation sleeve 8, and in particular their common intersection area "b," are implemented in such a way that the inner installation sleeve 6 can be inserted from an installation side 32 into the outer installation sleeve 8. In this embodiment, for this purpose, the inner installation sleeve 6 is first inserted into the outer installation sleeve 8, subsequently the elastomeric element 10 in the form of the elastomeric sleeve 14 is inserted into the recess 15 in the subsection "a", and the finished assembled device 1 is thus made ready for installation.

In this embodiment, the inner installation sleeve 6 is implemented and situated in such a way that it protrudes in relation to the terminal edge 34 of the outer installation sleeve 8 by the play amount "c" in the direction of the longitudinal axis $A_L$, pointing toward the bar receptacle 3, so that after the installation of the device 1 or the rollbar 2 on the vehicle 4, a vibration clearance 12' is also formed in this area, which essentially corresponds to the vibration clearance 12 between inner installation sleeve 6 and outer installation sleeve 8.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicants' invention.

What is claimed is:

1. A device for fastening a rollbar on a vehicle, comprising:
an inner installation sleeve configured to be operationally linked to a bar receptacle on the vehicle, wherein the inner installation sleeve has a fastener receptacle in its sleeve interior, which is configured to be operationally linked to a fastener on the bar receptacle;
an outer installation sleeve at least partially enclosing the inner installation sleeve having an outer sleeve wall configured to be operationally linked to the rollbar, wherein the inner installation sleeve and the outer installation sleeve are arranged coaxially with respect to their respective longitudinal axes ($A_L$); and
at least one elastomeric element comprising an elastomeric sleeve which is situated between the inner installation sleeve and the outer installation sleeve, and positioning the inner installation sleeve relative to the outer installation sleeve in such a manner that the inner installation sleeve and the outer installation sleeve are spaced apart from one another and contact-free via a vibration clearance except in an area in which the inner installation sleeve and the outer installation sleeve are connected together via the at least one elastomeric element;
wherein a subsection (a) along the longitudinal axes of the inner and outer installation sleeves along which the elastomeric element is situated is formed by a radial setback of an outer wall of the inner installation sleeve and a radial setback of an inner wall of the outer installation sleeve;
the elastomeric element being configured to engage in a friction-locked manner in a recess formed by the setback of the outer wall of the inner installation sleeve and the setback of the inner wall of the outer installation sleeve such that the inner installation sleeve is positioned in a spaced manner with respect to the outer installation sleeve;
the inner installation sleeve and the outer installation sleeve mutually having an intersection area (b), axially offset from the elastomeric element along the longitudinal axes of the inner and outer installation sleeves, which is configured to secure the inner installation sleeve and the outer installation sleeve in a location relative to one another;

one of the inner installation sleeve or the outer installation sleeve having a radially protruding locking extension which engages into a radially set-back extension receptacle provided on the other of the inner installation sleeve or the outer installation sleeve to form the intersection area (b), with the locking extension and the extension receptacle being configured and situated in such a manner that the vibration clearance results between them such that the locking extension and the extension receptacle of the inner installation sleeve and the outer installation sleeve do not strike against one another in a case of normal vibrations, and striking only occurs, in a case of a failure of the friction lock by the elastomeric element or in a case of vibrations which exceed a normal oscillation curve, such that radial movement of the inner installation sleeve and the outer installation sleeve relative to one another is stopped by striking engagement of the locking extension and the extension receptacle.

2. The device according to claim 1, wherein the inner installation sleeve and the outer installation sleeve are implemented as rotationally-symmetric and coaxial to their respective longitudinal axis ($A_L$).

3. The device according to claim 1, wherein the subsection (a) is formed by a peripheral recess on the outer wall of the inner installation sleeve and on the inner wall of the outer installation sleeve.

4. The device according to claim 1,
wherein, to form the intersection area (b), the inner installation sleeve has the locking extension, which protrudes radially out of its outer sleeve wall, and the outer installation sleeve has the extension receptacle, which is radially set back into its inner sleeve wall, into which the locking extension protrudes while at least maintaining the vibration clearance.

5. The device according to claim 1, wherein the intersection area (b) and the subsection (a) are situated one behind the other in relation to the longitudinal axes ($A_L$) of the inner installation sleeve and the outer installation sleeve.

6. An attachment part for attachment on a vehicle having at least one device according to claim 1.

7. The attachment part of claim 6, further comprising a vehicle,
wherein the vehicle comprises a vibration roller.

8. The attachment part of claim 6, wherein the at least one device is integrated on a rollbar.

9. The device according to claim 1, further comprising an attachment part,
wherein the attachment part comprises a rollbar.

10. The device of claim 1, further comprising a vehicle,
wherein the vehicle comprises a vibration roller.

11. The device according to claim 1,
wherein, to form the intersection area (b), the outer installation sleeve has the locking extension, which protrudes radially inward of its inner sleeve wall, and the inner installation sleeve has the extension receptacle, which is radially set back into its outer sleeve wall, into which the locking extension protrudes while at least maintaining the vibration clearance.

* * * * *